Oct. 17, 1967 C. CANTOR 3,348,053
AMPLIFIER CLAMPING CIRCUIT FOR HORIZON SCANNER
Filed Sept. 14, 1964

INVENTOR
Clarence Cantor
BY
ATTORNEY

United States Patent Office 3,348,053
Patented Oct. 17, 1967

3,348,053
AMPLIFIER CLAMPING CIRCUIT FOR HORIZON SCANNER
Clarence Cantor, Rockville, Md., assignor to the United States of America as represented by the Administrator of the National Aeronautics and Space Administration
Filed Sept. 14, 1964, Ser. No. 396,444
6 Claims. (Cl. 250—206)

ABSTRACT OF THE DISCLOSURE

An amplifier clamping circuit having a unique combination of input and output filters together with an output clamping scheme for use with a pulse source in which the pulses having a DC bias level subject to variations that are large compared to the amplitude of the pulse are to be measured, and where the pulse amplitude and shape are irregular and variable. The input and output filters may be both of the same general form but the input filter time constant is substantially greater (ten times or more) than that of the output filter, and the output filter is periodically clamped to ground for a short time and then unclamped before the next pulse is received.

---

Figure 1:
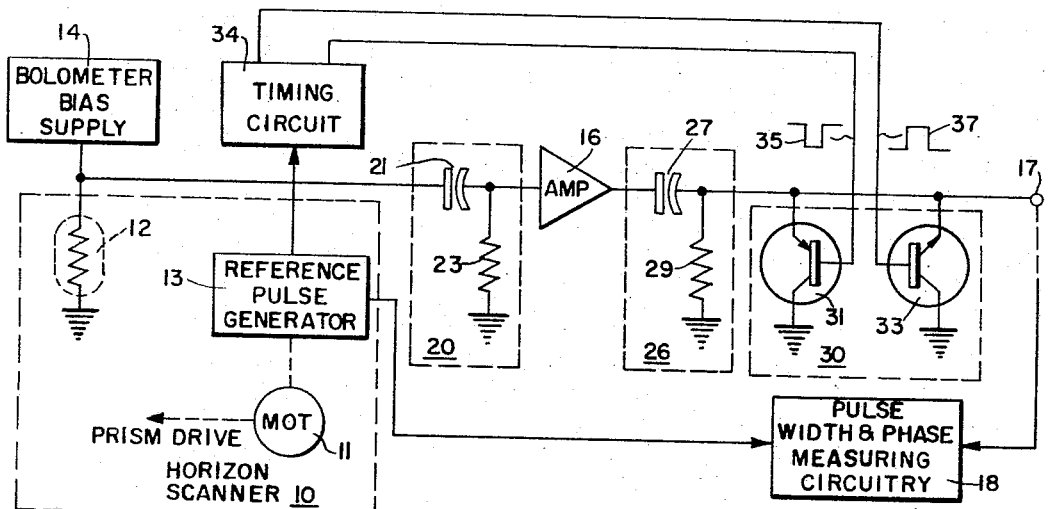

The invention described herein may be manufactured and used by or for the Government of the United States of America for governmental purposes without the payment of any royalties thereon or therefor.

This invention relates generally to pulse measuring systems, and more particularly to a clamped amplifier circuit arrangement that enables amplification and accurate measurement of a parameter such as the width and phase of pulses in systems wherein the sensing device generating the pulses has a DC bias level subject to variations that are large compared to the amplitude of the pulses being measured.

There are a number of applications wherein parameters such as the width and phase of a low level pulse, which pulse may vary in magnitude and shape, is measured as an indication of a physical condition. In many such applications the sensing device generating the pulse is one of a class of radiation detectors including solid state photoconductors and thermistor bolometers that experience a change in electrical conductivity when exposed to thermal or optical radiation in selected ranges of the electromagnetic spectrum. The sensing device is provided with a DC bias, and a change in current therethrough provides an indication of a change in incident radiation. Since the DC bias may be subject to large variations with respect to the change produced by incident radiation, and since it is desirable to process the output of the sensing device in the form of an AC signal, the incident radiation is periodically interrupted. This interruption may, for example, be produced by rotating the field of view of the sensing device or by causing its field of view to be interrupted by a rotating disc. It is, then, a parameter of pulses produced by such interruption that is to be measured, and for accurate measurement thereof each pulse must be compared to a reference level.

As a more specific example, the sensing device generating the pulses may be the infrared thermistor bolometer of the horizon scanner of a spacecraft, producing signals as the scanner's field of view crosses the earth. The measured width and phase of these signals (referred to as earth pulses) are used for navigational and control purposes such as determining the attitude of the spacecraft with respect to the earth.

In order to accurately measure the width and phase of the earth pulses it is necessary to determine exactly when each pulse has begun and when it has ended. Since the pulses can vary considerably in shape and amplitude due to clouds and various thermal disturbances over portions of the earth, it is desirable to detect pulse start and pulse finish by means of an amplitude detector having a threshold set very close to a reference level corresponding to cold space. This in turn requires that the reference level (space signal level) be established prior to the beginning of each earth pulse.

The prior art techniques for establishing the space and earth signal levels of a horizon scanner include the use of an automatic gain control system wherein the gain of an AC amplifier coupled to the bolometer is controlled to maintain a constant AC output. The maximum and minimum levels of a cycle then provide relatively constant reference levels representing earth and space signals, respectively, and determination of the beginning and end of an earth pulse is made by amplitude detection with respect to either or both of these reference levels. To avoid any distortion of any one cycle the time constant of the AGC system must be long compared to one cycle of the scanner, and the temperature change in the earth thermal pattern seen by the scanner (due to spacecraft motion) can cause an error in the pulse width and phase detection until the AGC system brings the amplifier output back to the desired level. In addition, variations in pulse amplitude and shape caused by different earth thermal patterns may cause the AGC system to "set-up," resulting in errors in determining the width and phase of subsequent pulses.

Another method for establishing a reference level for accurate measurement of the earth pulse is to clamp the amplifier output to zero reference potential during the space portion of the scan and to unclamp the amplifier sometime prior to a subsequent earth pulse, with the output of the amplifier remaining essentially zero during the unclamped period of the space pulse. However, known techniques for implementing this method have been found to be unworkable. The bolometer has an appreciable long term DC drift due to variations in ambient temperature and the output signal corresponding to an earth pulse is small (in the order of a fraction of a millivolt), making initial DC amplification impracticable. Accordingly, the output of the bolometer must be AC coupled to the amplifier input by a low frequency cut-off network. It is not feasible to clamp the amplifier directly at its input because the inaccuracies associated with clamping are of the same order of magnitude as the earth pulse itself. This objection may be overcome by clamping the amplifier at its output; however, clamping the amplifier output does not discharge the transient voltage of the low frequency network at the amplifier input. Hence, a short time after unclamping, the amplifier output voltage returns to its pre-clamped level, thus destroying the zero reference level.

Accordingly, it is among the objects of the present invention to provide an improved amplifier clamping circuit arrangement to produce a reference signal level for accurate measurement of parameters such as width and phase of low level pulses.

Another object of the invention is to provide an improved AC coupled amplifier clamping arrangement to allow accurate measurement of the width and phase of pulses having an amplitude small with respect to a varying DC bias level.

A further and more specific object of the invention is to provide an improved clamped amplifying circuit for the output for a bolometer having an appreciable DC bias drift, which circuit enables accurate measurement of the width and phase of the pulses of varying shapes and amplitudes generated by the bolometer.

Figure 2A:
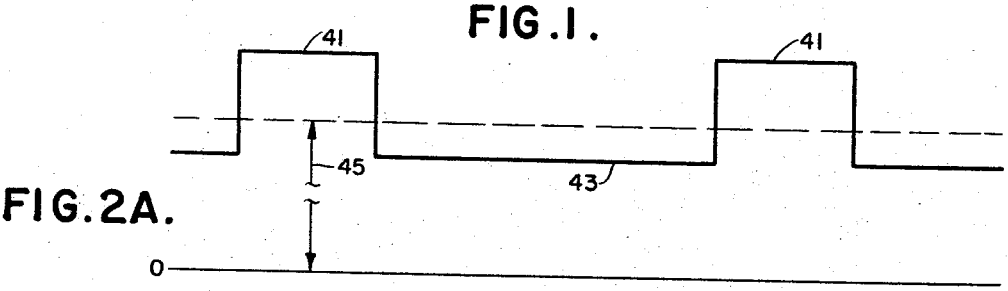
Figure 2B:
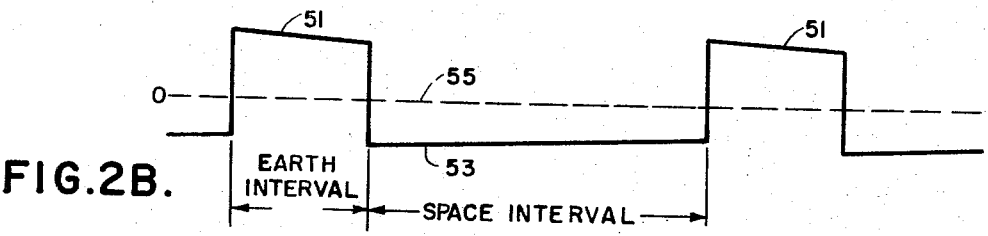
Figure 2C:
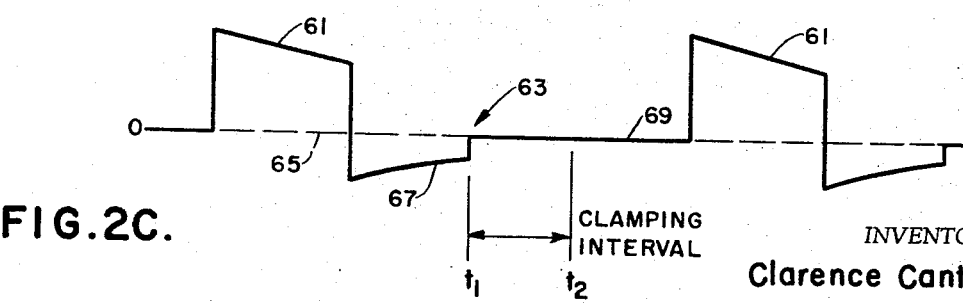

Other objects as well as the features and the attending advantages of the invention will become apparent from the following description when taken in conjunction with the accompanying drawing, in which:

FIGURE 1 is a schematic representation of a preferred embodiment of the invention; and FIGURES 2A–2C are a series of waveforms helpful in understanding the concepts of the invention.

The improved amplifier clamping circuit arrangement of the present invention permits the amplification and accurate measurement of parameters such as the width and phase of relatively low amplitude pulses of varying width, phase, and shape that are generated by a sensing device having a DC bias level subject to variations large with respect to the pulse amplitude. Typically, although not limiting, the sensing device may be the infrared bolometer of a horizon scanner that generates small output pulses as the scanner field of view crosses the earth. The output of the bolometer is AC coupled to an amplifier and thence to pulse width and phase measuring circuitry. In order to establish a zero reference level for accurate pulse width and phase measurement, the output of the amplifier is clamped to the zero reference level during the space portion of the scan and unclamped prior to the next earth pulse, with the output of the amplifier remaining essentially zero during the subsequent unclamped portion of the space scan.

In accordance with the present invention, an accurate reference level is maintained by coupling an output low frequency RC filter between the amplifier output and the pulse width and phase measuring circuitry. The time constant of the output filter limits amplifier noise but still provides a good response to the pulses generated by the bolometer. The bolometer output is coupled to the amplifier input by an input low frequency RC filter having a time constant at least an order of magnitude greater (ten times or greater) than the time constant of the output filter. A clamping circuit connected to the output filter discharges transient voltages therein during an interval between pulses, and after unclamping the rate of change of the amplifier output is determined primarily by the long time constant transient voltage established by the input filter, with this rate of change further diminished by the impedance of the amplifier output filter. As a result the amplifier output remains essentially at the zero reference level during the remaining time between pulses to provide a zero reference level for accurately establishing the beginning and the end of the subsequent pulse.

Referring now to FIGURE 1, horizon scanner 10 includes a scanner motor 11 which drives a prism to produce an optical conical scan for bolometer 12. Motor 11 also drives reference pulse generator 13 to produce pulses that initiate clamping and provide a reference for phase measurement, as will be subsequently discussed. Bias supply 14 provides a DC bias for bolometer 12. Bolometer 12 may, for example, be a thermistor-type bolormeter sensitive to radiation in the infrared portion of the electromagnetic spectrum, producing a change in its resistivity to modulate its DC bias and provide an indication of such radiation. Thus bolometer 12 generates a pulse (termed the earth pulse) as the field of view of scanner 10, located in a spacecraft, crosses the earth. The with and phase of such pulses may in turn be used to compute the attitude of the spacecraft with respect to the earth. Systems of this type are known in the art and in detail form no part of the invention. A typical horizon scanner is the NIMCO horizon scanner, supplied by General Electric Company, Valley Forge, Pa., for use on the NIMBUS series meteorological satellites.

The output of bolometer 12 is AC coupled to the input of amplifier 16 by filter network 20. The output of amplifier 16 is coupled to terminal 17 by filter network 26. Amplifier 16 may be any stable, high gain DC amplifier having a sufficient frequency response to pass pulses generated by bolometer 12 without appreciable distortion. As an example, for a scan frequency of approximately 16 c.p.s., a bolometer time constant of about 1.2 milliseconds, and a nominal earth pulse of about 93 degrees, amplifier 16 should have a bandwidth from DC to about 266 c.p.s.

Terminal 17 is coupled to suitable pulse detecting circuitry, representatively shown at 18. Pulse detecting circuitry 18 also receives a timing pulse from reference pulse generator 13. Typically such circuitry may include an amplitude detector with a threshold level set to produce a response when the leading and trailing edges of the pulse produced by bolometer 12 exceed a reference level by predetermined amounts. This response, in turn, may be used to activate a suitable multivibrator or counter and clock arrangement to provide an indication of the width between specified points on the leading and trailing edges of the pulses generated by bolometer 12, and/or the phase relation of the leading and trailing edges of the pulse to the timing pulse generated by reference pulse generator 13 at a precise point in each revolution of the horizon scanner. It is apparent that a number of pulse width, phase, or other types of measuring arrangements may be used for pulse detecting circuitry 18, the important fact being that an accurate zero reference level is applied to its input, at terminal 17, prior to each pulse.

A clamping circuit 30 is coupled between terminal 17 and a reference potential such as ground. To insure positive clamping of the output of amplifier 16 for signals of either polarity clamping circuit 30 includes complementary transistors such as PNP transistor 31 and NPN transistor 33, each connected with their collector and the emitter electrodes in shunt between terminal 17 and ground reference potential. Transistors 31 and 33 are normally cut off and when clamping signals 35 and 37 of the polarities indicated (negative for PNP transistor 31 and positive for NPN transistor 33) are applied to their base electrodes either one or the other conducts, depending on the polarity of the output of amplifier 14.

Clamping signals for the base electrodes of transistors 31 and 33 are derived from a suitable timing circuit 34 which receives timing pulses from a reference pulse generator 13 located in horizon scanner 10. Timing circuit 34 produces signals of the polarity indicated in synchronism with the scanning motion of horizon scanner 10 such that either transistor 31 or 33 is switched to conduction once during the space portion of each scan cycle.

Filter networks 20 and 26 are low frequency resistance-capacitance (RC) networks. Preferably filter network 20 includes capacitor 21, coupled between the output of bolometer 12 and the input of amplifier 16, and resistor 23, connected between the input of amplifier 16 and a reference potential such as ground. Filter 26 includes capacitor 27, coupled between the output of amplifier 16 and terminal 17, and resistor 29, connected between terminal 17 and ground reference potential. As mentioned, filter network 26 should have a time constant ($T_b$) that limits amplifier low frequency noise and provides a good response to the earth pulse. For example, it may be shown (assuming an approximate 16 c.p.s. scan frequency and a nominal 93° earth pulse width) that a 40 millisecond time constant will satisfy these conditions. By further making the time constant of filter network 20 ($T_a$) an order of magnitude greater than that of filter network 26 (that is, at least 10 times greater) the space signal level, subsequent to unclamping but prior to the next earth pulse, will remain at essentially zero (the level at which it is clamped) to provide a reference for the measurement of the width and phase of the next earth pulse. Stated another way, $T_a \geq 10 T_b$, where $T_a$ is the RC time constant of capacitor 21 and resistor 23 and $T_b$ is the RC time constant of capacitor 27 and resistor 29. Thus, for example, if the above conditions are met, unclamping approximately 6 milliseconds before the next earth pulse will give rise to less than a 0.3% (of maximum pulse voltage) change in the zero reference level, producing a negligible error in pulse width and phase measurement.

With particular reference now to waveforms of FIGURES 2A–2C, a typical square wave generated by bolometer 12 as the result of the scanning operation of horizon scanner 10 is illustrated by FIGURE 2A. The earth pulse is indicated by portion 41 of the waveform and the space interval of the scanning cycle is indicated by portion 43 of the waveform. It is to be understood that this waveform is simplified for the purpose of illustration and that pulse 41 may not be of constant amplitude, nor will each pulse necessarily be of the same width. Also, the "squareness" of the wave will be rounded off by the bolometer time constants. The average value of the waveform is displaced from a zero reference axis (as indicated by arrow 45) as a consequence of the DC bias supplied to bolometer 12. It is to be noted that the amplitude of each earth pulse 41 is small with respect to the DC bias for bolometer 12, as well as with respect to possible variations of this bias level as may be produced, for example, by ambient temperature variations.

FIGURE 2B represents the waveform appearing at the input of amplifier 16 and includes a modified earth pulse 51 (corresponding to portion 41 of the waveform of FIGURE 2A) and a modified space pulse 53 (corresponding to portion 43 of the waveform of FIGURE 2A). Pulses 51 and 53, respectively, have a decaying amplitude as a result of the time constant of filter network 20, with a slope that is essentially linear because the time constant of filter 20 is much greater than the width of pulses 41 and 43. In addition, because of the AC coupling provided by capacitor 21, the DC bias component of the signal is removed and the waveform of FIGURE 2B extends above and below ground level 55 such that the average value of pulses 51 and 53 taken together is zero.

FIGURE 2C represents the waveform appearing at terminal 17 and includes earth pulse 61 and space interval 63. Earth pulse 61 has a decreasing amplitude similar to pulse 51 but with a greater slope because of the much smaller time constant of filter 26. The space portion 63 of the waveform includes an initial interval 67 extending below zero reference level 65. At time $t_1$ conduction of either transistor 31 or 33 clamps terminal 17 to zero reference level 65, with such clamping continuing until time $t_2$, at which time terminal 17 is unclamped. As mentioned, clamping circuit 30 is initiated by pulses of appropriate polarities applied to the bases of transistors 31 and 33 by timing circuit 34, synchronized with the scanning operation of horizon scanner 10. During this clamping interval filter network 26 is discharged and the space interval of FIGURE 2C is clamped to zero reference level 65. Subsequent to unclamping, during final interval 69 of the space interval, the rate of change of the signal at output terminal 17 is determined by the long time constant of filter network 20 together with the impedance of filter network 26, and accordingly the space interval of FIGURE 2C remains essentially at zero reference. This in turn, maintains a zero reference level for accurate determination of the leading and trailing edges of the next earth pulse 61.

Although a preferred embodiment of the invention has been set forth with particularity in conjunction with a horizon scanner wherein accurate measurement of the width and phase of earth pulses is desired, it should be apparent that it may be advantageously practiced in other systems wherein a sensing device requires a DC bias, which bias may be subject to variations large with respect to the amplitude of the pulses being measured. The pulses may vary in amplitude and shape so long as the sensor signal level between pulses remains relatively constant at a level below the minimum amplitude of any one pulse. Other means than that specifically disclosed may be used to generate the pulses and to provide a reference signal during the interval between pulses. For example, a rotating disc (or chopper) having a mirror surface may be utilized to periodically obscure the field of view of the sensing device and to reflect radiation from a reference black body thereon. The specific sensing device may be any device requiring a DC bias and experiencing a resistivity change in response to a change in a physical condition. And although the invention is particularly beneficial in pulse width and/or phase measuring systems, the accurate zero reference level provided prior to each pulse may be utilized in measuring other pulse parameters such as pulse amplitude, rise time, etc.

It is therefore obvious that numerous modifications and variations of the invention are possible in the light of the above teachings, and that within the scope of the appended claims the invention may be practiced otherwise than as specifically described herein.

What is claimed as new and desired to be secured by Letters Patent of the United States is:

1. Electrical apparatus including in combination, sensing means for generating periodic pulses, a parameter of which pulses is to be measured, said pulses being superimposed on a steady state signal subject to variations large compared to the amplitude of the pulses to be measured, signal amplification means having an input and an output, a first filtering network coupled between said sensing means and the input of said amplification means, output terminal means for connection to pulse detection means, a second filter network coupled between the output of said amplification means and said output terminal means, said first filter network having a time constant at least ten times greater than the time constant of said second filter network, and circuit means for clamping said output terminal means to a reference potential during a portion of the interval between pulses to thereby provide a zero reference level for measurement of a parameter of said pulses.

2. Apparatus as defined in claim 1 wherein said input filter network comprises a resistance-capacitance network having its capacitor coupled between said sensing means and the input of said amplification means and its resistor connected between the input of said amplification means and said reference potential, and said second filter network comprises a resistance-capacitance network having its capacitor coupled between the output of said amplification means and said output terminal means and its resistor connected between said output terminal means and said reference potential.

3. In a system for measuring a parameter of periodic pulses generated by a sensing device, said sensing device being supplied with a DC bias that is subject to slow long-term variations large in amplitude compared to the amplitude of the pulses being measured, the combination including amplification means having an input and an output, an input filter network comprising a capacitor coupled between said sensing device and the input of said amplification means and a resistor connected between the input of said amplification means and a reference potential, output terminal means for connection to pulse detection means, an output filter network comprising a capacitor coupled between the output of said amplification means and said output terminal means and a resistor connected between said output terminal means and said reference potential, with the RC time constant of said input filter network at least ten times the RC time constant of said output filter network, and circuit means for clamping said output terminal means to said reference potential during a portion of the interval between pulses being measured, thereby providing a zero reference level for measurement of a parameter of said pulses.

4. Clamped amplification circuit means for use with a bolometer type radiation detector, said radiation detector producing periodic pulses a parameter of which is to be measured, with the signal level between pulses providing a reference level for measurement of a parameter of said pulses, said clamped amplification circuit means including in combination, an amplifier having an input and an output, an output filter network coupled between said radiation detector and the input of said amplifier, output terminal means for connection to pulse detection means, an output filter network coupled between the output of said amplifier and said output terminal means, said input filter having a time constant at least an order of magnitude greater than the time constant of said output filter, and circuit means for clamping said output terminal means to a reference potential during a portion of the interval between pulses produced by said radiation detector, providing a zero reference level corresponding to the interpulse reference level for measurement of a parameter of said pulses.

5. The clamped amplifier circuit means as defined in claim 4 wherein said input filter network comprises a capacitor coupled between said radiation detector and the input of said amplifier and a resistor connected between the input of said amplifier and said reference potential, and said output filter network comprises a capacitor coupled between the output of said amplifier and said output terminal means and a resistor connected between said output terminal and said reference potential, with the RC time constant of said input filter network being at least ten times the RC time constant of said output filter network.

6. Clamped amplification circuit means for use with the radiation sensing device of a horizon scanner, said sensing device producing periodic earth pulses the width and phase of which is to be measured, with the space signal level between pulses providing a reference level for detection of said earth pulses thus permitting measurement of the width and phase of said earth pulses, said clamped amplification circuit means including in combination, an amplifier having an input and an output, an input filter network comprising a capacitor coupled between said sensing device and the input of said amplifier and a resistor connected between the input of said amplifier and a reference potential, output terminal means for connection to pulse detection means, an output filter network comprising a capacitor coupled between the output of said amplifier and said output terminal means and a resistor connected between said output terminal means and said reference potential, with the RC time constant of said input filter network at least ten times the RC time constant of said output filter network, and circuit means for clamping said output terminal means to a reference potential during a portion of the interval between earth pulses produced by said sensing device, thereby providing a zero reference level corresponding to the space signal level for detection of said earth pulses and measurement of the width and phase of said earth pulses.

References Cited

UNITED STATES PATENTS 2,922,100   1/1960   Ketchledge _____ 250—203 X
3,281,530   10/1966   Sennhenn _____ 307—88.5

ARCHIE R. BORCHELT, *Primary Examiner.*

RALPH G. NILSON, *Examiner.*

J. D. WALL, *Assistant Examiner.*